June 29, 1965      E. V. BUNTING      3,191,687
AUTOMATIC DRAFT CONTROL AND COMPENSATING SYSTEM FOR TRACTORS
Filed April 25, 1962      4 Sheets-Sheet 1

INVENTOR.
ERNEST V. BUNTING
BY
*Wolfe, Hubbard, Voit & Osann*
ATTORNEYS.

INVENTOR.
ERNEST V. BUNTING
BY
Wolfe, Hubbard, Voit & Osann
ATTORNEYS.

June 29, 1965     E. V. BUNTING     3,191,687
AUTOMATIC DRAFT CONTROL AND COMPENSATING SYSTEM FOR TRACTORS
Filed April 25, 1962     4 Sheets-Sheet 3

INVENTOR.
ERNEST V. BUNTING
BY
Wolfe, Hubbard, Voit & Osann
ATTORNEYS.

United States Patent Office 3,191,687
Patented June 29, 1965

3,191,687
AUTOMATIC DRAFT CONTROL AND COMPENSATING SYSTEM FOR TRACTORS
Ernest V. Bunting, Detroit, Mich., assignor to Massey-Ferguson Inc., Detroit, Mich., a corporation of Maryland
Filed Apr. 25, 1962, Ser. No. 190,164
7 Claims. (Cl. 172—9)

The invention relates to controls for hydraulic systems and more particularly to hydraulic systems of the type provided in tractors for raising and lowering an implement hitch linkage and for regulating the position or working depth of an implement coupled to the hitch linkage.

It is an object of the present invention to provide an automatic draft control system for tractors having hydraulically controlled implement hitch linkages which smooth out and stabilize the controlled response of such linkages when the implement encounters variable soil reaction forces.

A more particular object is to provide a control system of the above type which reduces the tendency of the hitch linkage to oscillate or "bob" in response to momentary fluctuations in implement draft load.

Another object is to provide a control system of the above mentioned type wherein a dual feedback arrangement governs the operation of the draft control linkage. It is a more detailed object to provide such a system in which one feedback responds to mechanical movement while the second feedback responds to hydraulic pressure variations.

It is a further object to provide such a control system which compensates for over-correction in the elevation of the hitch linkage initiated by the mechanically linked draft control mechanism. In this regard, it is an object to provide a hydraulic feedback compensator which varies the linkage of the draft control mechanism upon variations in hydraulic pressure.

It is also an object of the invention to provide a control system which retains the advantageous features of prior systems and yet improves the operational stability of ground engaging implements with corresponding improvement in the efficiency of the tractor.

Other objects and advantages of the invention will become apparent from the following detailed description of the preferred embodiment illustrated in the accompanying drawings, in which.

Figure 1:
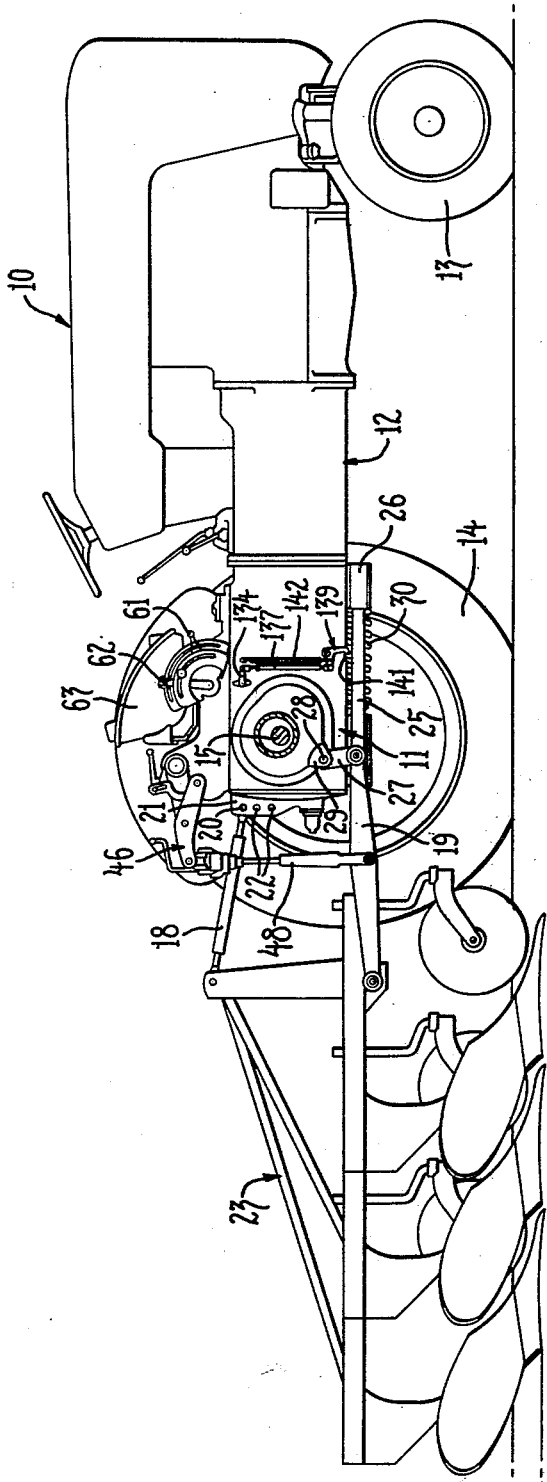
FIGURE 1 is a side view of a tractor and mounted implement incorporating the invention and shown with one of the rear wheels removed and with parts of the implement broken away for purposes of disclosure.

The improved controls provided by the instant invention are adapted for use in any of the tractor hydraulic systems utilizing the well-known Ferguson system of automatic draft control with selective position control. Tractors equipped with such hydraulic systems customarily have an implement hitch linkage consisting of three links arranged in a triangular pattern with two of the links arranged side-by-side at the base of the triangle while the third link is disposed above and approximately midway between the lower links.

For automatic draft control, the control systems of such tractors include a draft responsive element, that is, an element adapted to be shifted against force exerted by a biasing spring an amount proportional to the draft load imposed on the hitch linkage. Actuating forces may be transmitted to the draft responsive element through the top hitch link as in the system disclosed in Bunting Patent 2,996,124 or through the lower draft links as in the system disclosed in Bunting Patent No. 2,996,125. For purposes of illustration, the invention has been shown as incorporated in a system of the type disclosed in the latter patent. It is to be understood, however, that it is not intended to limit the invention to use in the particular system in which it has been shown here nor to limit it to details of construction of the preferred embodiment illustrated, the intention being to cover all modifications and adaptations falling within the spirit and scope of the invention as more broadly or generally characterized in the appended claims.

Referring to the drawings, the invention has been shown as embodied in an illustrative tractor 10 having a rear housing 11 which, with the usual transmission housing and engine, is bolted together to form a frameless tractor body 12. The body is supported by front dirigible wheels 13 and pneumatic traction wheels 14, the latter being driven in well-known manner by axle shafts 15 which, in turn, are driven through a differential by a power delivery shaft 16 coupled to the tractor engine through a selective gear transmission or equivalent and a disengageable clutch. An auxiliary shaft 17 continuously driven from the tractor engine provides the drive for the tractor power take-off shaft and also for a pump 36 which supplies pressure fluid for the tractor hydraulic system.

The exemplary tractor is equipped with a three link implement hitch including an upper link 18 and a pair of lower or draft links 19. Since, as indicated above, this tractor is of the type in which the draft responsive element is associated with and actuated by the draft links, the upper link 18 is pivotally anchored as by a pin 20 to a stationary bracket 21 fixed to the rear end of the tractor housing 11. To provide for adjustment of the posture of an implement 23 coupled to the hitch, the bracket 21 is formed with three vertically spaced sets of holes 22 for receiving the pivot pin 20.

As shown in FIG. 1, the draft links 19 are connected for universal swinging movement to opposite sides of a control frame 25 supported for longitudinal movement fore-and-aft of the tractor and adjacent the lower side of the tractor body. The frame 25, which is generally A-shaped, has its tapered forward end supported and guided in a bracket 26 bolted to the underside of the tractor body. At its aft end the frame 25 is supported by a pair of link assemblies 27 pivoted as by bolts 28 to lugs 29 integral with and depending from opposite sides of the tractor body.

Longitudinal movement of the frame 25 either forwardly or rearwardly is resisted by a heavy coiled compression spring 30 connected between the frame and the tractor body. For present purposes, it is sufficient to note that the spring is confined between front and rear spring engaging caps 31 and 32 carried by and movable with the frame. In the absence of any draft loads on the links 19, the rear cap 32 is held in contact with an adjusting nut carried by a stationary abutment 33 fixed to the tractor. Upon application of draft to the links 19 as when an implement is being drawn through the soil by the tractor, the frame 25 is pulled back together with the cap 31 to compress the spring 30. The frame 25 may then be said to constitute a draft responsive element since it is displaced rearwardly proportionately to the draft load imposed on the hitch linkage.

Fore-and-aft movement of the frame against the resistance of spring 30 is brought about by ground loads imposed in the implement 23, which tilt the implement about the upper pin 20 shown in FIG. 1 and move the frame through draft links 19. Such movement of the frame is used to automatically actuate a hydraulic control system incorporated in the tractor to bring about corrective positioning or elevation of the three-point hitch and its associated implement. Actuation of the system may also be accomplished manually by proper manipulation of a hand control arrangement including levers 61 and 62 disposed within convenient reach of the operator's seat 63.

Figure 2:
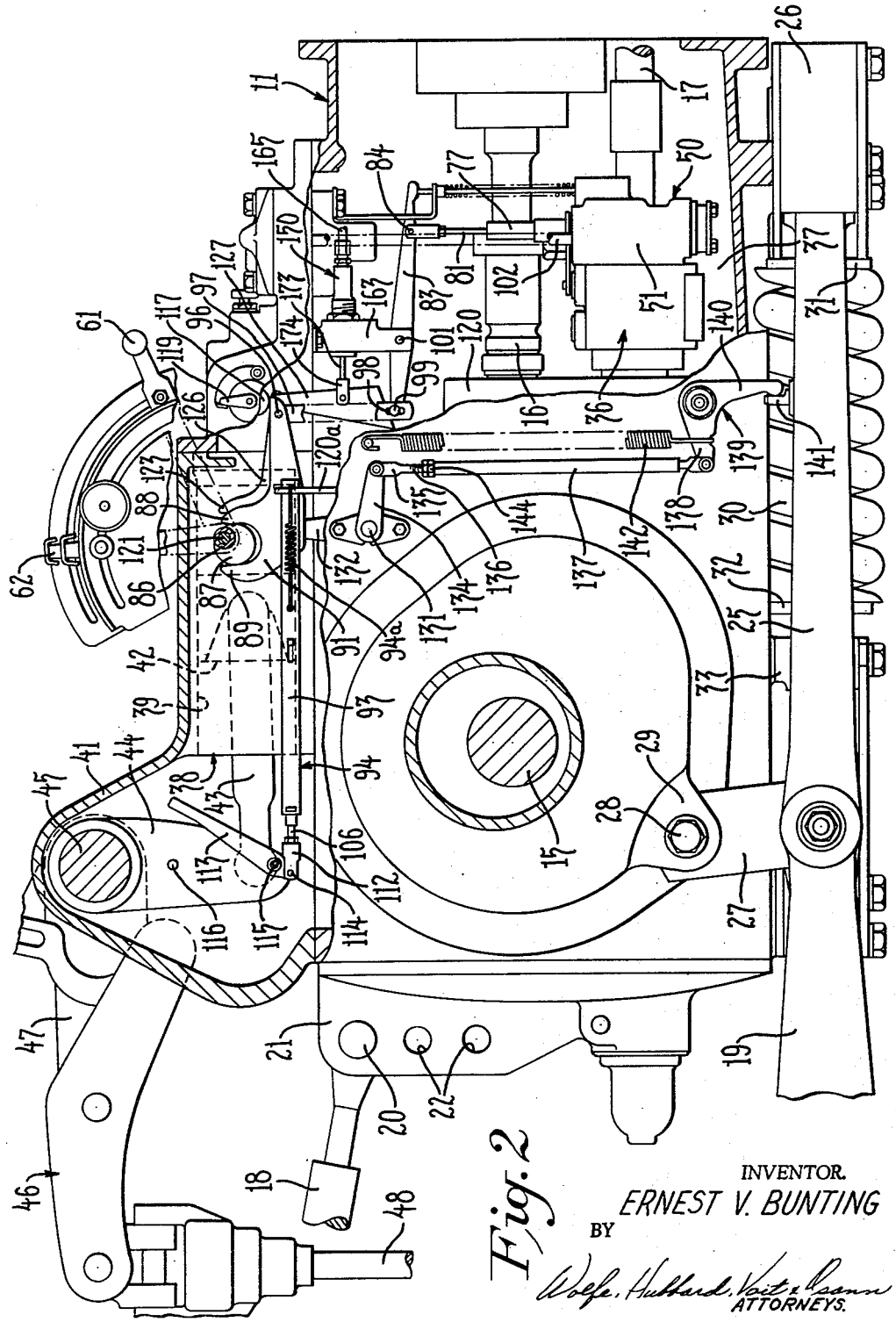
FIG. 2 is an enlarged sectional view of a rear portion of the tractor shown in FIG. 1.
Figure 3:
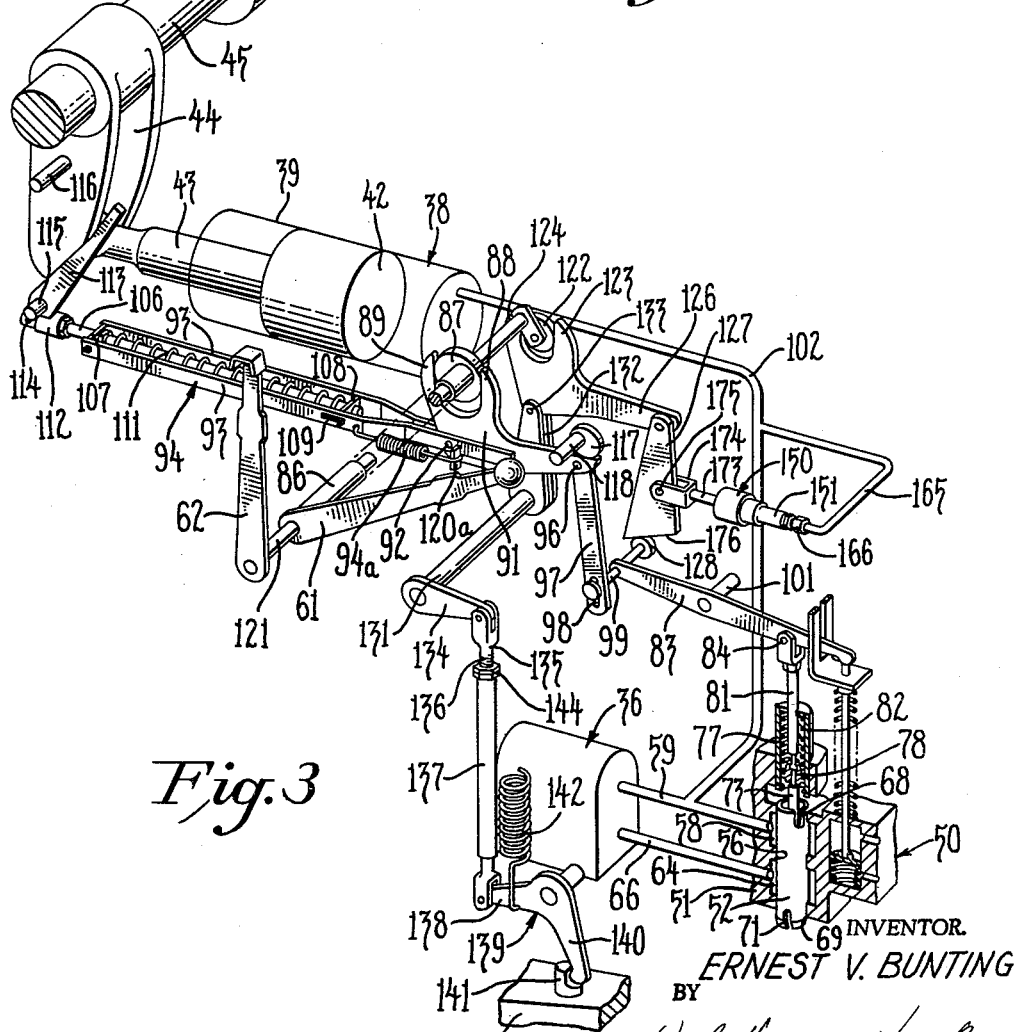
FIG. 3 is a perspective view diagrammatically showing internal and external portions of the mounting and control system incorporated in the tractor.

Raising and lowering of the draft links 19 is accomplished by means of a hydraulic system which, as shown in FIGS. 2 and 3, includes a pump 36 immersed in a fluid reservoir 37 formed by the walls of the tractor housing 11. The pump is driven by the shaft 17 coupled to the tractor engine and is capable of delivering hydraulic fluid from the reservoir 37 surrounding the pump to a hydraulic actuator 38. The illustrated actuator is a one-way ram comprising a cylinder portion 39 formed integrally with and at the interior of a cover housing 41 mounted on the top of the housing 11. The cylinder opens to the rear and slidably receives a piston 42 having a connecting rod 43 projecting rearwardly. The rearward end of the rod is ball shaped and is received in a socketed lower end of an arm 44 rigidly connected to a transverse rock or lift shaft 45 having its intermediate portions journaled in the cover housing 41. Each end of the lift shaft 45 has a crank arm assembly 46 having a crank arm 47 splined on the shaft and connected to one of the lower draft links 19 by a drop link 48. The arrangement is such that when pressure fluid is supplied to the closed end of the cylinder 39, the piston rod 43 is forced rearwardly and the arm 47 swings upwardly to raise the lowered draft links 19. In like manner, when fluid is exhausted from the cylinder the piston 42 retracts due to the weight of the links and implement so that the links 19 swing downwardly. Furthermore, when the implement is in a ground working position, fluid may be maintained in the cylinder so that the implement is literally supported on the oil and the load of the implement is added to that of the tractor to increase traction.

The volumetric rate at which oil is supplied to or exhausted from the cylinder 39 determines the rate at which the draft links 19 and the implement thereon are either raised or lowered. In the present system, oil is supplied from the pump 36 driven continuously by the engine and since the engine speed necessarily varies to meet the various demands made on the tractor, the volumetric delivery rate of oil is controlled by varying the amount of oil permitted to enter the pump. Such control is obtained through a valve 50 which also controls the rate at which fluid can escape from the ram or motor 38.

The function of the control valve 50 is to prevent the flow of fluid or to meter fluid to or from the pump. The valve mechanism is immersed in fluid in the reservoir 37 and is located in a housing 51 at one side of the pump 36. The valve includes a generally tubular valve means or plunger 52 supported for axial movement within a bore 56 having a chamber 58 which communicates with a pump discharge passage 59, and another chamber 64 which communicates with a pump intake passage 66.

When the valve plunger is in its neutral position, the outer surface of the plunger 52 bridges the chambers 58 and 64 so that the flow of fluid in the passages 59 and 66 is prevented and fluid is locked in the system. As the valve plunger 52 is moved axially and downwardly from its neutral position, a pair of narrow axially extending slots 68 move into the chamber 58 and permit fluid to escape from the pump 36, through the passages 59, chamber 58, the interior of the plunger 52 and through the open end 69 of the stepped bore 56 to the reservoir. This also exhausts fluid from the cylinder 39, allows the piston rod 43 to retract into the cylinder and links 19 to swing downwardly.

The maximum rate of lowering of the implement hitch linkage depends on the rate at which fluid can escape from the system. This in turn is dependent on the effective area of the escape or drop ports formed by the slots 68 which are exposed to the chamber 58. The effective length of the slots increases progressively as the plunger 52 is moved downwardly from a neutral position and the volume of escaping oil also increases progressively so that the implement will drop at an increasing rate until the effective area of the slots reaches a maximum.

As the plunger 52 moves in the opposite direction or upwardly from a neutral position, the chamber 58 remains closed by the outer surface of the plunger and a pair of large slots 71 (only one of which is shown) at the lower end of the plunger pass upwardly and enter the chamber 64. Oil in the reservoir is then free to enter the bottom of the valve housing and to flow through the slots 71 into the low pressure chamber 64 and then through the intake passage 66 of the pump. Oil is then forced by the pump to the hydraulic actuator 38 causing the piston rod 43 to extend and to swing the arms 47 upwardly for raising the hitch linkage and implement.

Mechanism for moving the valve plunger 52 includes a plunger rod 73 secured within the plunger 52. The upper end of the rod 73 projects into a cylindrical housing 77 supported at the top of the valve housing 51 and is provided with a connector 78 for receiving the end of a rod 81, projecting through the upper end of the housing 77. A spring 82 is mounted on the rod 81 and within the housing 77 to react between the connector 78 and the upper end of the housing. The spring is effective to urge the rods 81 and 73 downwardly to move the valve plunger 52 toward its discharge position. The upper end of the rod 81 is pivotally connected at 84 to one end of an arm 83, which as shown in FIGS. 2 and 3 has its other end connected to additional valve actuating mechanism.

The mechanism for actuating the valve plunger affords both automatic and manual control of the hydraulic system. Automatic control is brought about when loads on the implement are of sufficient magnitude to move the control frame 25 against the action of spring 30. This causes movement of the valve plunger 52 and the implement is raised to reduce the implement load or is lowered to increase the load so that the frame will return to its original position and permit the valve plunger 52 to return to its neutral position. This type of control makes it possible to maintain a substantially constant load on the implement and is referred to as draft control. The lever 62 may be termed a draft control lever and is used to adjust the relationship between the frame 25 and the valve plunger 52 to determine the implement load which in operation is required to automatically maintain the valve plunger at its neutral position. The other lever 61 is used to raise and lower the implement between transport and ground working positions at which the implement becomes subjected to draft control. The operation obtained with lever 61 may be termed position control since movement of the lever from one end of its range to the other causes a corresponding movement of the hitch linkage throughout its entire range.

Referring now to FIG. 3, the position control lever 61 extends radially from one end of a hollow shaft 86 journaled in the side of the housing and has its other end disposed within the housing. The end opposite the lever is provided with a circular cam 87 mounted eccentrically of the shaft and positioned between a pair of jaws 88 and 89 formed on the end of a cam lever 91. The cam lever is mounted to pivot about a pin 92 between the side elements 93 of a double link assembly 94 and the forward end is pivotally connected by a pin 96 to a depending link 97 having a slot 98 in its lower end to receive a pin 99 in the rearward end of the rocker arm 83. If the pivot pin 92 is held stationary, rearward movement of the position control lever 61 from the position shown in FIG. 3 forces the circular cam 87 against the jaw 88 to move the cam lever in a clockwise direction about the pin 92. The forward end of the lever 91 and the link 97 will swing downwardly so that the upper end of the slot 98 acts against the pin 99 on the rocker arm 83 to swing the latter in a counterclockwise direction about its pivot pin 101. Such movement is effective to move the valve plunger 52 upwardly to an intake or supply position which results in admission of fluid through the passage 66 to the pump 36 and delivery from the pump through the conduit 102 to the actuator 38 for raising the hitch linkage.

It will be understood that forward or clockwise movement of the lever 61 forces the circular cam 87 against the other jaw 89 to swing the forward end of the cam lever 91 upwardly together with the link 97. As the slot 98 in the link 97 moves upwardly, the spring 82 urges the valve plunger 52 downwardly from its neutral position and at the same time swings the rocker arm 83 so that the pin 99 is maintained in engagement with the upper end of the slot 98. During downward movement of the plunger 52 fluid is discharged from the actuator 38 through conduit 102 and passage 59 to the reservoir. The rate of fluid discharge from the actuator 38 determines the rate of lowering the arms 46 and the attached implement 23. The rate of fluid discharge may be controlled by limiting the extent of movement of the valve plunger 52 in the discharge direction. As shown in FIGS. 2 and 3, a cam 117 is fixed on the end of a rotatable shaft 118 journaled in the wall of the tractor housing 11. The cam 117 is engageable with the forward end of the position control cam lever 91 to limit its upward or counterclockwise movement and, consequently the downward movement of the valve plunger 52 toward discharge. The outer end of the shaft 118 mounts a lever 119 which may be rotated by the operator to vary the extent of upward movement of the cam lever 91 to fit the requirements of the implement being used and the particular operating circumstances.

As pointed out above, movement of the position control lever 61 in opposite directions will cause movement of the valve plunger 52 from its neutral position to either a fluid supply or to a fluid discharge position. This brings about movement of the lift arms 47 which actuates a follow-up mechanism for returning the valve plunger to neutral to stop further movement of the hitch linkage when it reaches a position corresponding to the location of the lever. This mechanism includes the double link assembly 94 which has a rod 106 mounted to slide through a spacer element 107 rigidly joining the ends of the side elements 93. The forward end of the rod mounts a slide element 108 which extends through alined slots 109 in the side elements 93. A compression spring 111 surrounds the rod and reacts between the spacer 107 and slide element 108 to normally maintain the double link assembly in the condition shown in FIG. 3. The forward end of the link assembly 94 is pivotally connected to the cam lever 91 by a pin 92 and the rearward end of the rod is provided with a clevis 112 pivotally connected to a lever 113 by a pin 114. An intermediate portion of the lever 113 is supported on a pin 115 rigid with the cover housing 41 and the upper end of the lever is adapted to engage a stud 116 fixed to the actuating arm 44.

When the control lever 61 is moved forwardly toward the position shown in FIG. 3, the cam lever 91 swings counterclockwise against the cam 117 permitting movement of the valve plunger 52 to its discharge position and permits lowering of the implement hitch. As the hitch drops the lift shaft 45 rotates in a counterclockwise direction and the stud 116 swings the lever 113 clockwise to pull the link assembly 94 rearwardly. This swings the cam lever 91 clockwise about the circular cam 87 as a pivot and returns the valve plunger 52 to neutral as the implement hitch drops to an elevation corresponding to the location of the position control lever.

If the control lever 61 is moved to its fully lowered position, as shown in FIG. 3, the position follow-up mechanism is ineffective to return the valve plunger 52 to neutral. Movement of the valve plunger 52 will now be operated by the draft control mechanism as will be hereinafter explained. It will be understood, however, that when the cam lever 91 contacts the cam 117 it may no longer be rotated in a counterclockwise direction. Now, as the lever 61 is moved fully forward, the cam 87 urges the jaw 89, pin 92, and link assembly 94 to the rear and causes the lever 113 to separate from stud 116. A spring 94a connected between the link assembly 94 and a guide member 120a secured to the housing serves to maintain the cam lever 91 biased against the cam 117 under these circumstances.

When the lift arms 47 are in their fully lowered position, rearward movement of the position control lever 61 will first move the cam lever 91 and assembly 94 forward and lever 113 will engage the stud 116. Continued rearward movement of lever 61 will now swing the end of the cam lever 91 downwardly and move the valve plunger 52 upwardly from its neutral position to an intake position. This brings about a delivery of fluid to the actuator 38 which causes upward swinging movement of the lift arm 47 and rearward swinging of the actuator arm 44. As the stud 116 retreats rearwardly the lever 113 remains in engagement with the stud due to the movement of the link 94, cam lever 91, link 97 and rocker arm 83, which is caused by the spring 82 associated with the valve plunger 52. The valve plunger 52 remains in an intake or supply position as long as the position control lever 61 is being moved rearwardly. However, when movement of the lever 61 stops, the rearward moving stud 116 and the follow-up mechanism permits the spring 82 to return the valve plunger 52 from an intake position to its neutral position. As the valve plunger 52 reaches its neutral position, movement of the lift mechanism, including the arms 47 and 44, stops and all the movable mechanism is stationary.

If the lever 61 is moved slowly from the position shown in FIG. 3, the lift arms 47 will swing upwardly to positions which at any given time will correspond to the position of the lever 61. When movement of the lever 61 stops the lift arms 47 will also stop and the hitch linkage will remain at an elevation which corresponds to a given position of the control lever 61. However, if the position control lever 61 is jerked rearwardly and upwardly, it may be possible to achieve a condition in which hydraulic fluid cannot be supplied to the actuator fast enough to swing the lift arm 47 upwardly and actuate the follow-up mechanism. Under this condition the follow-up mechanism will remain momentarily stationary and the cam lever 91 will swing about its pivot 92 so that the lower end of the lever 97 moves downwardly into engagement with an internal wall 120 of the housing 11 as best shown in FIG. 2. Thereafter, the rotating cam 87 will force the cam lever 91 forwardly and will extend the link 94 against the action of spring 111. As soon as sufficient fluid reaches the actuator 38 so that the lift arms 47 will move upwardly, the lever 113 is free to follow the movement of the stud 116 and the spring 111 collapses the link 94 to its original position. In this manner the extensible link 94 forms a breakout mechanism which protects the various internal control linkages when the position control lever 61 is moved so rapidly that the hydraulic system and the follow-up mechanism cannot immediately respond.

The position control arrangement just described makes the plunger 52 responsive to movement of both the lever 61 and links 19 to bring about movement of the latter to an elevation corresponding to the position of the lever.

Figure 5:
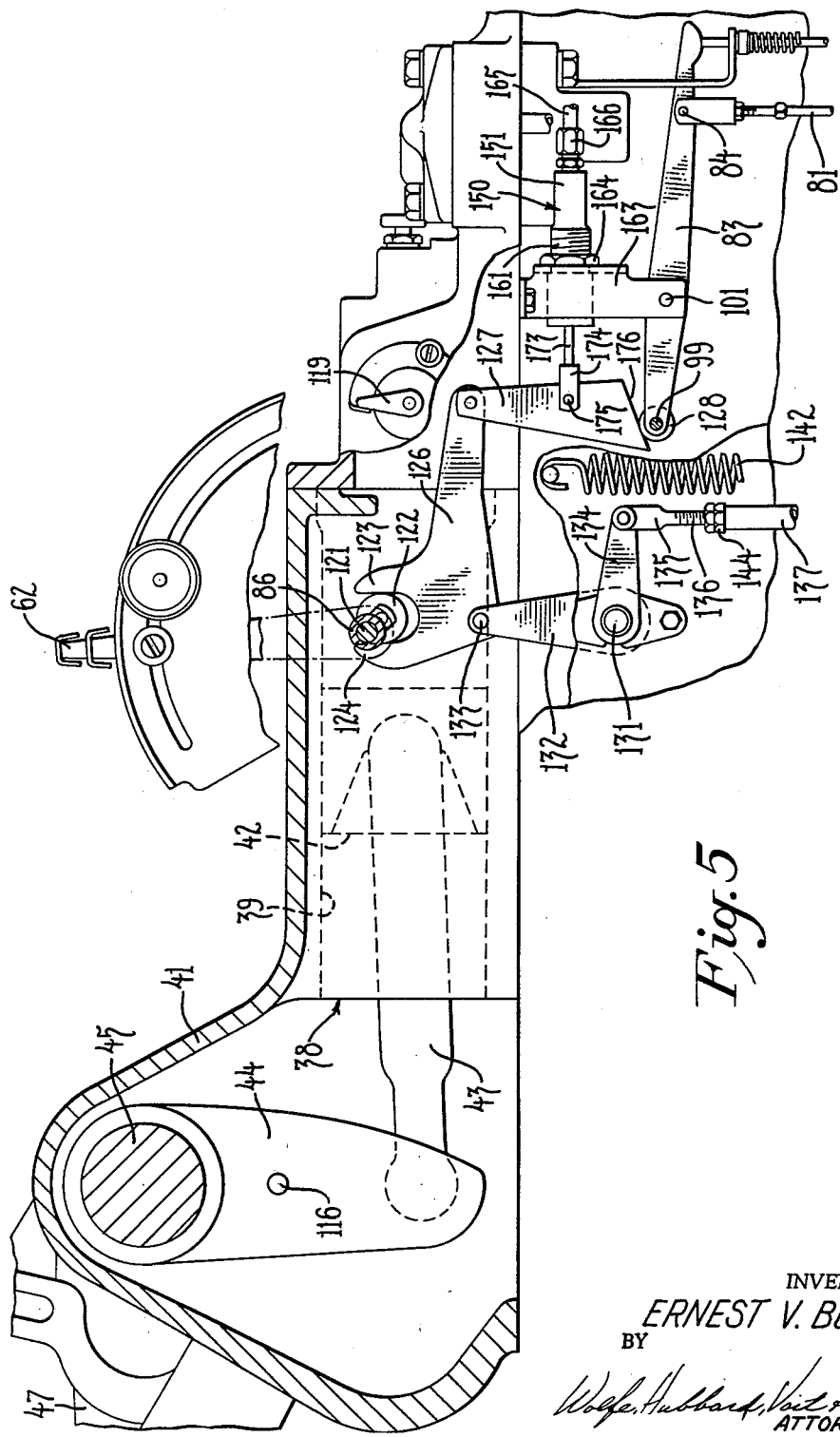
FIG. 5 is an enlarged view of one portion of the control linkage shown in FIG. 2.

The draft control lever 62 shown in FIGS. 2, 3 and 5 extends radially from one end of a shaft 121 supported in the hollow position control shaft 86. The other end of the shaft is provided with a circular cam 122 mounted eccentrically of the shaft and disposed between jaws 123 and 124 of a cam lever 126. The cam lever is pivotally connected to a link 127 which also engages a roller 128 on the pin 99 at the end of the rocker arm 83. Thus far the draft control mechanism is very similar to the position control mechanism and movement of the lever 62 in a clockwise direction from the position shown in the drawings is effective to bring about movement of the cam lever 126 similar to the movement of the cam lever 91 associated with control lever 61.

Movement of the cam lever 126 may also be effected by movement of the control frame 25 at the bottom of the tractor. The mechanism for accomplishing such operation includes a shaft 131 journaled for rotation in the side of the housing 11. As seen in FIG. 3, the inner end of the shaft rigidly supports a pair of alined, radially extending arms 132 which are pivotally connected at opposite sides of the cam lever 126 by a pin 133. The other end of the shaft which is disposed externally of the housing is provided with a crank arm 134 having its free end pivotally connected to a clevis 135 at the end of a rod 136. The rod 136 is telescoped into a tubular link 137 having its lower end pivotally connected to an arm 138 of a bell crank 139 pivotally mounted on the exterior of the tractor housing 11. The other arm 140 of the bell crank is maintained in engagement with a stop 141 formed integrally with the control frame 25 by means of a tension spring 142 acting between the arm 138 and a point on the tractor body. The spring also urges the upper end of the tubular link upwardly into engagement with the nuts 144 on the rod 136. Engagement of the link 137 with the nuts 144 affords a one-way connection between the frame 25 and cam lever 126 which may be adjusted by moving the nuts axially of the rod 136.

During ordinary operation with the implement in the ground, the draft control lever is moved to a selected position such as shown in FIG. 3. This point will correspond to a position of the frame and a deflection of the spring 30 which will maintain the valve plunger at neutral. Any variation in the reaction on the implement sufficient to cause a deflection of the spring and a change in the position of the control frame 25 will cause movement of the bell crank 139 and arm 134 to pivot the cam lever 126 about the circular cam 122 and bring about movement of the valve plunger 52 from the neutral position. The accompanying change in elevation of the hitch and implement will vary the reaction on the implement so that the spring 30 will return the control frame 25 to its normal position and effect a return of the valve to neutral. If the operator desires to operate the implement at a deeper position in the ground, he may move the lever 62 forwardly. This lowers the implement and as the load on the implement increases and deflects the spring to some new value, the plunger returns to neutral. Consequently, the lever 62 may be considered as a means for selecting various values of spring deflection and, consequently, positions of the control frame 25 at which the valve plunger 52 will be maintained at neutral.

From the foregoing detailed description of the draft control mechanism and its operation, it will be appreciated that every change in implement draft load produces a corresponding change in the elevation of the draft links 19 and the attached implement. This automatic control linkage has been found to be very advantageous to stabilize the draft load when the implement is operated at a given depth range, even though substantial and subsisting variations in draft conditions occur. This, in turn, produces a corresponding stability in the tractor output requirements and the resulting improved fuel economy and reduction of strain imposed on the tractor due to load variations. However, under operating conditions, the implement frequently encounters momentary or nearly instantaneous fluctuations in draft load as well as more sustained variations. Since even momentary draft fluctuations cause a displacement of the control frame 25, the bell crank 139 and connected linkage acts to move the valve plunger 52 from its neutral position and causes the lift arms to move to a new position. In the meantime the draft load may have returned to its former value even before the draft arms have come to a new position to overcome the momentary fluctuation. Therefore, since the draft load and depth of operation are once again unbalanced, the draft control linkage must now make a correction in the opposite direction. Thus, it may be seen that the draft control mechanism has a definite tendency to over-compensate for momentary changes in draft load. In turn, this produces an oscillating movement in the draft arms until stability is once again achieved. In the operation of a field implement this tendency is characterized as "hunting" or "bobbing" and is highly undesirable for smooth and efficient operation.

In accordance with the present invention, a second automatic control assembly 150 is incorporated in the draft control linkage to smooth out and stabilize changes due to momentary fluctuations in draft load. This automatic control is in the nature of a hydraulic feedback responsive to pressure variations in the hydraulic actuator 38 and is designed to correct for over-compensation in draft control initiated by movement of the control frame 25.

Figure 4:
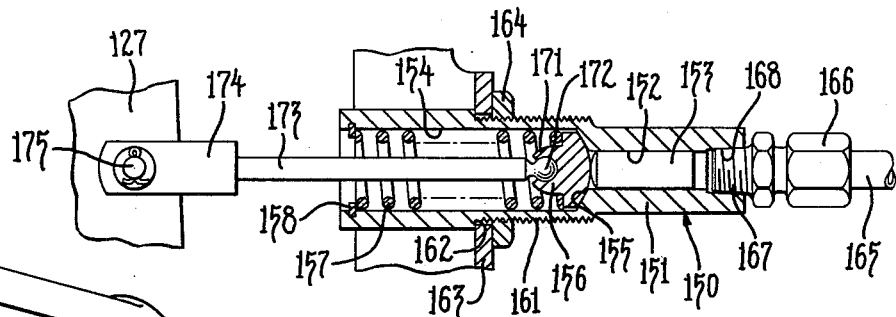
FIG. 4 is a partial sectional view of the feedback control piston as shown in FIG. 3 and drawn at an enlarged scale.

In the preferred embodiment, as seen in FIG. 4, the hydraulic feedback control assembly 150 includes a cylinder body 151 having at one end an axial bore 152 in which a closely-fitted piston 153 is slidably inserted. The other end of the body 150 is provided with an enlarged axial chamber 154 which terminates at its inner end adjacent the bore 152 by a tapered shoulder 155. A plunger 156 slidably mounted within the chamber 154 is held in biased engagement with the shoulder 155 and the piston 153 by means of a spring 157 acting against a washer 158 retained at the outer end of the chamber. The outer surface of the body 151 is provided with a necked down threaded portion 161 terminated at one end by an annular shoulder 162 and is inserted into an opening in a flange member 163 secured to the tractor housing 11. The body 151 is firmly secured to the flange 163 between the shoulder 162 and a nut 164 on the threaded portion 161.

The hydraulic feedback signal is communicated to the control assembly 150 through a hydraulic line 165 connected to the supply line 102 between the pump 36 and hydraulic actuator 38. The other end of the line 165 carries a hydraulic connector 166 having a threaded portion 167 suitable for engaging a tapped end portion 168 of the bore 152. It may now be seen that the piston 153 responsive to a pressure increase in the supply line 165 is displaced to the left in the bore 152 and pushes the plunger 156 in the same direction against the force of the spring 157. When the hydraulic pressure decreases the spring forces the plunger 156 toward the shoulder 155 and returns the piston 153 to the right in the bore 152. Since the spring force increases with deflection of the spring 157, the displacement of the piston and plunger is directly proportional to the pressure increase in the hydraulic line.

It is to be understood that the pressure which actuates the hydraulic control assembly 150 is dependent upon two components, represented by the gravity force and the force of acceleration exerted through the lift arms 47. In other words, the gravity force is dependent upon the weight of the implement 23 supported by the draft arms 47 and is directly converted into hydraulic pressure by the piston 42 acting in the cylinder 39. When the implement is in transport position this is the only component which is translated into hydraulic pressure, assuming, of course, that the arms 44 do not engage some projection or stop on the housing 11. However, even when the implement is in the ground engaging position, it is still supported by a head of oil acting against the piston 42 within the cylinder 39. In this case, the gravity component also includes (i.e. the weight of the implement is modified by) the vertical component resulting from ground reaction on the implement. In addition, as the depth of tillage changes, the piston 39 converts a second hydraulic pressure component which is dependent upon the rate of acceleration of the draft arms 47 in either an upward or downward direction. Finally, it should also be appreciated that the pressure of the fluid in the cylinder 39 due to the force of piston 42 is further modified by the rate in which fluid is supplied or expelled from the cylinder 39.

To connect the hydraulic feedback control assembly 150 to the draft control linkage, the plunger 156 contains a socket 171 adaptable for receiving a ball 172 on one end of a control rod 173. This control rod is pivotally connected at its other end to the draft link 127, for example, by a clevis 174 and pin 175. As shown in FIGS. 3 and 5, the draft link 127 has a beveled lower cam surface 176 which engages the roller 128 on the pin 99. Thus, depending on the position of the link 127 as determined by the control rod 173 coupled to the feedback control assembly 150, the effective length of the link 127 is variable to change the draft control linkage.

It may now be appreciated that this automatic adjustment in the draft control system is responsive to pressure variations in the hydraulic actuator 39. As the pressure in the actuator 39 changes, it is communicated through the conduit 102 and line 165 to the control assembly 150. An increase in hydraulic pressure in the actuator forces the spring biased piston 153, control rod 173 and coupled link 127 to the left as seen in the drawings. Thus, the effective length of the link 127 between cam 126 and cross pin 99 is shortened and the spring 82 urges the valve plunger 52 towards its exhaust position. Since such a pressure increase is ordinarily initiated by an increased load on the control frame 25 and corresponding movement of the valve plunger 52 to its supply position, the automatic control assembly 150 serves to neutralize this action. The effect of this compensating action is to stabilize the aciton of the automatic draft control linkage and decrease the tendency of the implement to oscillate due to momentary fluctuations in draft load.

Thus far the operations of the position control and draft control systems and their effect on the valve plunger 52 have been considered independently of each other. The relation of the two systems including the automatic response mechanisms and their effect on each other will be more readily understood by now considering a complete lifting and lowering cycle of the implement hitch linkage.

If the initial condition is as shown in the drawings, the draft arms 47 are lowered and the implement is in the ground. The operation of the valve plunger 52 is now governed by the draft control mechanism including the variable link 127 and the automatic compensator 150. The control pin 99 is free to move up or down within the slot 98 of the position control link 97 and the lever 83 will accordingly move the valve plunger 52 to intake or discharge as may be required to maintain an even draft load and smooth operation.

As previously discussed, variations in the draft load cause corresponding movements of the control frame 25 against the spring 30. These movements are, in turn, transmitted to the variable link 127 by the draft control linkage including the bell crank 139 and cam lever 126. An increase in the draft load causes the link 127 to move downwardly and accordingly raises the valve plunger 52 to the intake position to supply fluid to the actuator 38 which, in turn, raises the lift arms 47 and results in decreasing the draft load. A decrease in draft load, of course, produces the opposite result.

Variations in draft load and the consequent supply or discharge of fluid to the actuator 38 also cause pressure variations in the hydraulic lines 102 and 165. These pressure variations actuate the automatic pressure compensating mechanism 150 and consequently move the variable link 127 to the right or left as seen in the drawings. It will be understood that an increase in pressure moves the link 127 to the left, thus shortening its effective length, while a decrease in pressure has the opposite effect. Accordingly, the compensating mechanism 150 smooths out instantaneous fluctuations in draft load which would otherwise cause the implement to "hunt" and "bob." On the other hand, sustained changes in the draft load produce vertical movement of the link 127 and result in a new elevation of the implement 23 and thus provide for smooth operation at a substantially constant draft load.

When the implement 23 is withdrawn from the ground, such as at the end of the field, only the position control lever 61 is moved. The rearward movement of the lever 61 first urges cam lever 91 forwardly and the follow-up lever 113 is rocked into engagement with stud 116 on the arm 44. After lever 113 engages the stud 116, further rearward movement of the lever 61 rotates the cam lever 91 in a clockwise direction swinging the link 97 downwardly against pin 99 and consequently moving the valve plunger 52 to intake position. Fluid is now supplied to the actuator 38, the arms 47 are raised and the implement is removed from the ground into transport position. During this movement the follow-up assembly 94 allows the arms 47 to be elevated to any given position which corresponds to the setting of the lever 61.

While the implement is being raised and lowered at the end of the field by the position control lever 61, the draft control lever 62 may be left at a constant setting. Thus, the depth of operation, which is governed by the draft control mechanism, is the same from one round to the next even though the implement has been raised and lowered. As the link 97 of the position control mechanism urges pin 99 downwardly, variable link 127 also follows the downward movement of the roller 128 and pin 99. This results from the fact that as the pin 99 moves downwardly, the lever 83 opens the valve plunger 52 to intake, fluid is supplied to actuator 38, draft load decreases, and the control frame 25 moves forward causing the bell crank 139 to rotate counterclockwise. However, since the pin 99 is engaged by link 97, the draft control mechanism does not cause the valve plunger 52 to move to discharge with the decrease in draft load. Rather, as the bell crank 139 rotates counterclockwise, the tubular linkage 137 telescopes axially away from the positioning nuts 144 on the rod 136. Thus, the overhanging weight of rod 136, crank arm 134, cam lever 126 and link 127 maintain the link 127 in contact with the roller 128, but the lost motion, resulting from operation of the position control linkage, is stored in the tubular link 137 of the draft control linkage.

To bring the system back into the arrangement shown in the drawings after a corner has been made at the end of the field, the lever 61 is merely returned to the position shown. This allows the pin 99 to rise since the valve spring 82 normally biased toward discharge will lift link 127, which is possible due to the lost motion stored in link 137. The rate of fluid discharge is, of course, controlled by the setting of cam 117 and the implement 23 descends. Since the position control lever 61 is moved fully forward, the cam lever 91, limited from rotation by the cam 117, must move rearwardly. This rotates the follow-up lever 113 away from stud 116 and the implement continues to descend until the draft load moves control frame 25 to the rear. The lost motion in the tubular link 137 is first taken up and subsequently variable link 127 moves downwardly returning the valve plunger 52 to its neutral position. This completes the full operating cycle and returns the parts to the positions shown in the drawings.

I claim as my invention:
1. In a tractor having a hydraulic actuator for raising and lowering an implement hitch linkage pivoted on the tractor, the combination of valve means movable from a neutral position to control the supply of fluid to and exhaust of fluid from the actuator, control means including a variable linkage connected to said valve means shiftable in response to a predetermined increase in draft load on the hitch linkage to impart positive movements of said valve means away from said neutral position to effect the supply of fluid to the actuator and consequent increase in fluid pressure for raising the hitch linkage, and hydraulic compensating means coupled to the actuator to adjust the effective length of said linkage in response to changes in fluid pressure in the actuator, said compensating means acting on said valve means in opposition to said control means so as to dampen the control affect of the latter.

2. In a tractor having a hydraulic actuator for raising and lowering an implement hitch linkage pivoted on the tractor, the combination of valve means movable from a neutral position to control the supply of fluid to and exhaust of fluid from the actuator, resilient means acting on said valve means and urging it in a direction to exhaust the fluid from the actuator to lower the hitch linkage, control means connected to said valve means shiftable in response to a predetermined increase in the draft load on the hitch linkage to impart positive movements of the valve means in a direction to effect supply of fluid to the actuator and consequent increase in fluid pressure for raising the hitch linkage, and hydraulic compensating means coupled to the actuator to adjust said control means in response to changes in fluid pressure in the actuator, said compensating means acting on said valve means in opposition to said control means so as to dampen the control effect of the latter.

3. In a tractor having a hydraulic actuator for raising and lowering an implement hitch linkage pivoted on the tractor, the combination of valve means movable from a neutral position to control the supply of fluid to and exhaust of fluid from the actuator, resilient means acting on said valve means and uring it in a direction to exhaust the fluid from the actuator to lower the hitch linkage, control means connected to said valve means shiftable in response to a predetermined increase in the draft load on the hitch linkage to impart positive movements of the valve means in a direction to effect supply of fluid to the actuator and consequent increase in fluid pressure for raising the hitch linkage, and hydraulic compensating means coupled to the actuator to adjust said control means in response to changes in fluid pressure in the actuator, said compensating means effective upon an increase in fluid pressure to permit said resilient means to urge said valve means in the direction to exhaust the fluid from said actuator and consequently to lower the hitch linkage and fluid pressure.

4. In a tractor having a hydraulic actuator for raising and lowering an implement hitch linkage trailingly pivoted at its rear end, valve means including a movable member operative in one position to initiate exhaust of fluid from the actuator to lower the hitch linkage and in another position to initiate delivery of pressure fluid to the actuator to raise the hitch linkage, said member being operative in an intermediate position to block delivery of fluid to or exhaust of fluid from the actuator, spring means urging said movable valve member toward said exhaust position, draft control means including a member movable in response to changes in the draft load of the hitch linkage, an operating linkage connecting said control member with said movable valve member shiftable in response to a predetermined increase in the draft load on the hitch linkage to impart positive movements of said valve member in a direction to effect delivery of fluid to the actuator and consequent increase in fluid pressure for raising the hitch linkage, adjusting means in said linkage operable manually to vary the effective length of the linkage, and hydraulic compensating means responsive to variations in fluid pressure in the actuator to automatically vary the effective length of said draft control linkage.

5. In a tractor having a hydraulic control system, a control frame disposed adjacent a lower side of said tractor for fore-and-aft movement, lower implement link means connected to said control frame for vertical swinging movement and for bodily movement with said frame, a hydraulic actuator operatively associated with said lower link means for raising and lowering the latter, valve means movable to control the supply of fluid to and the exhaust of fluid from said actuator to effect a raising and lowering of said link means, means including a variable length lever having a sloping cam face at one end thereof engageable with said valve means for moving said valve means in response to movement of said frame, and means including a spring biased piston coupled to said actuator for automatically shifting said one end of said lever thereby decreasing the effective length of said lever in response to an increase in fluid pressure in said actuator.

6. In a control system for a tractor having a vertically swingable implement hitch linkage and hydraulically operated actuator means for raising and lowering the hitch linkage, valve means having a shiftable member for controlling the delivery of pressure fluid to and exhaust of fluid from said actuator means, a manually operable lever pivotally mounted on the tractor, a linkage system connecting said lever for selectively positioning said valve member, said linkage system including an element variably positioned in accordance with the draft load imposed on the hitch linkage and a movable cam element providing a variable length connection with said shiftable valve means, hydraulic compensating means coupled to said actuator means and responsive to changes in fluid pressure, and said compensating means connected to said linkage system so as to vary the effective length of said cam element in accordance with fluid pressure variations in said actuator means.

7. In a control system for a tractor having a vertically swingable implement hitch linkage and hydraulic actuator means for raising and lowering the hitch linkage, said actuator means including a ram, a valve having a shiftable member controlling the flow of pressure fluid to and exhaust of fluid from said ram, draft responsive means including an element movable in response to changes in the draft load imposed on the hitch linkage, a motion transmitting linkage operatively connected with said element including a member shiftable by a hand lever to adjust the effective length of said motion transmitting linkage means including an actuating lever providing a connection between said linkage and said shiftable valve member, and means including a spring biased piston coupled to said actuator means for automatically adjusting the effective length of said motion transmitting linkage in response to changes in fluid pressure in said actuator means.

References Cited by the Examiner

UNITED STATES PATENTS

| 2,786,402 | 3/57 | Senkowski et al. | 172—9 |
| 2,804,814 | 9/57 | Czarnocki | 172—7 |
| 2,946,392 | 7/60 | Nelson | 172—7 |
| 2,996,125 | 8/61 | Bunting | 172—4 |
| 3,014,535 | 12/61 | Marindin | 172—7 |
| 3,014,536 | 12/61 | Marindin et al. | 172—3 |

FOREIGN PATENTS 632,884 12/49 Great Britain.

T. GRAHAM CRAVER, *Primary Examiner.*

A. JOSEPH GOLDBERG, ABRAHAM G. STONE,
*Examiners.*